United States Patent [19]
Goldman et al.

[11] 3,900,004
[45] Aug. 19, 1975

[54] AUTOMATIC CIRCULATING HATCHERY

[75] Inventors: Marvin A. Goldman, Great Neck; Jerome N. Goldman, New York, both of N.Y.

[73] Assignee: Penn-Plax Plastics, Inc., Garden City, N.Y.

[22] Filed: Apr. 1, 1974

[21] Appl. No.: 457,541

[52] U.S. Cl............................... 119/3; 119/5
[51] Int. Cl.²........................... A01K 63/00
[58] Field of Search............... 119/3, 5, 2; 210/169

[56] References Cited
UNITED STATES PATENTS

| | | | |
|---|---|---|---|
| 1,552,063 | 9/1925 | Kuehn | 119/3 |
| 3,140,691 | 7/1964 | Stark | 119/5 |
| 3,216,395 | 11/1965 | Girard | 119/3 X |
| 3,584,602 | 6/1971 | Stasio | 119/3 X |
| 3,651,785 | 3/1972 | Quinn | 119/5 |

Primary Examiner—J. N. Eskovitz
Attorney, Agent, or Firm—Mandeville and Schweitzer

[57] ABSTRACT

An automatic circulating fish hatchery is provided for detachable assembly with an aquarium as needed, with the hatchery having a separable nursery for receiving and segregating baby fish from the hatching parent and from the general aquarium environment. The nursery, after receiving the baby fish, may be detached and moved to a separate aquarium without exposure to adult fish. Included herewith are means for simply removing the baby fish from the hatching parent to the separable nursery, and means for accommodating more than one pregnant adult fish at the same time. The detachable hatchery and its separable nursery are also provided with constant circulation until transfer of the separable nursery to another aquarium.

6 Claims, 9 Drawing Figures

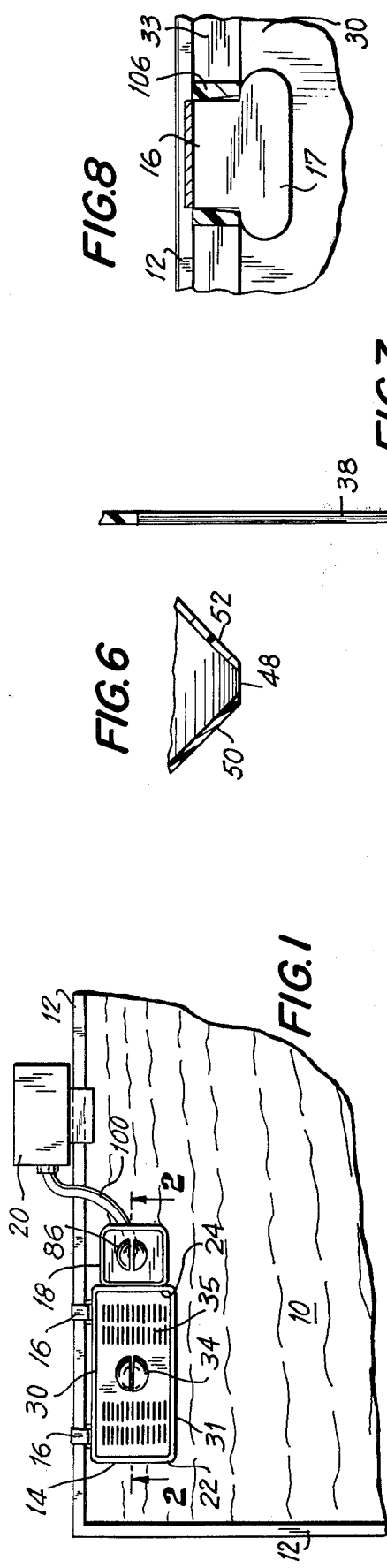
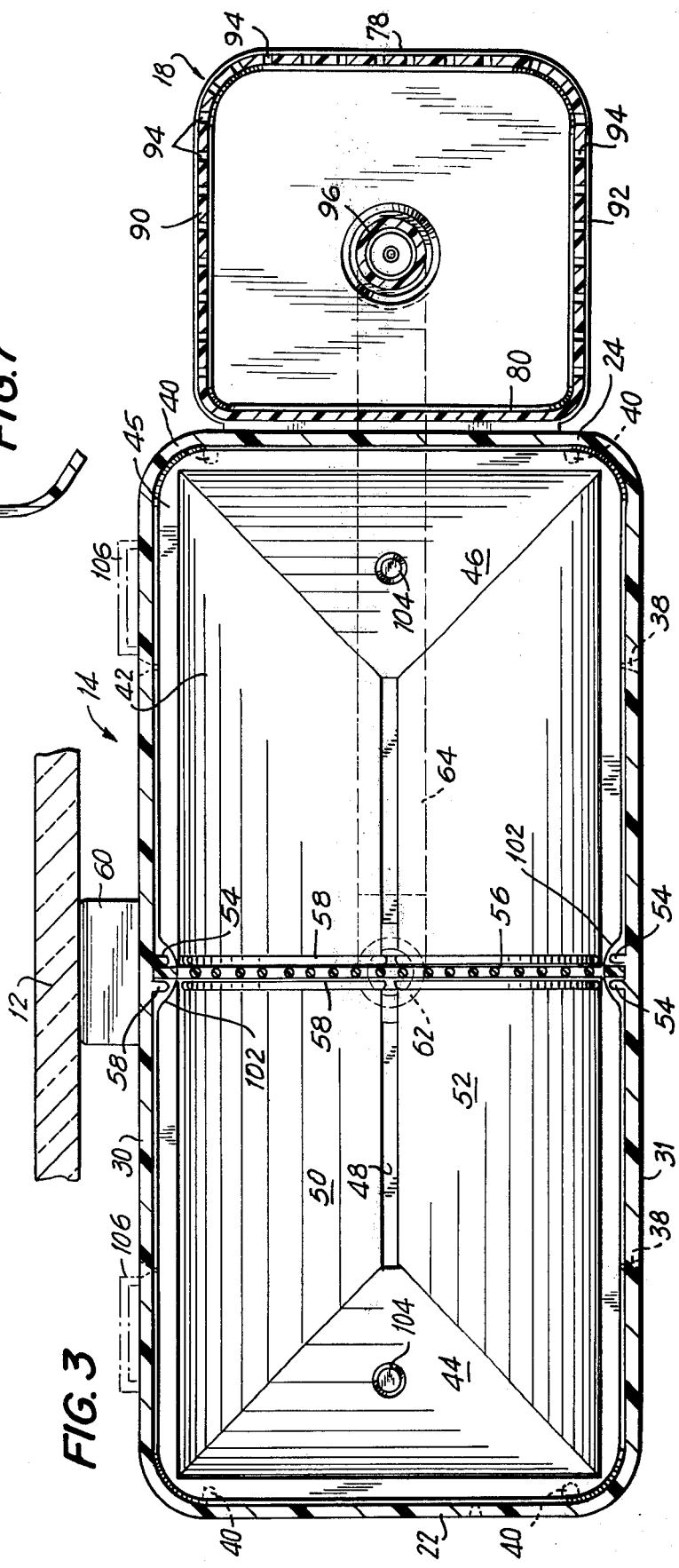

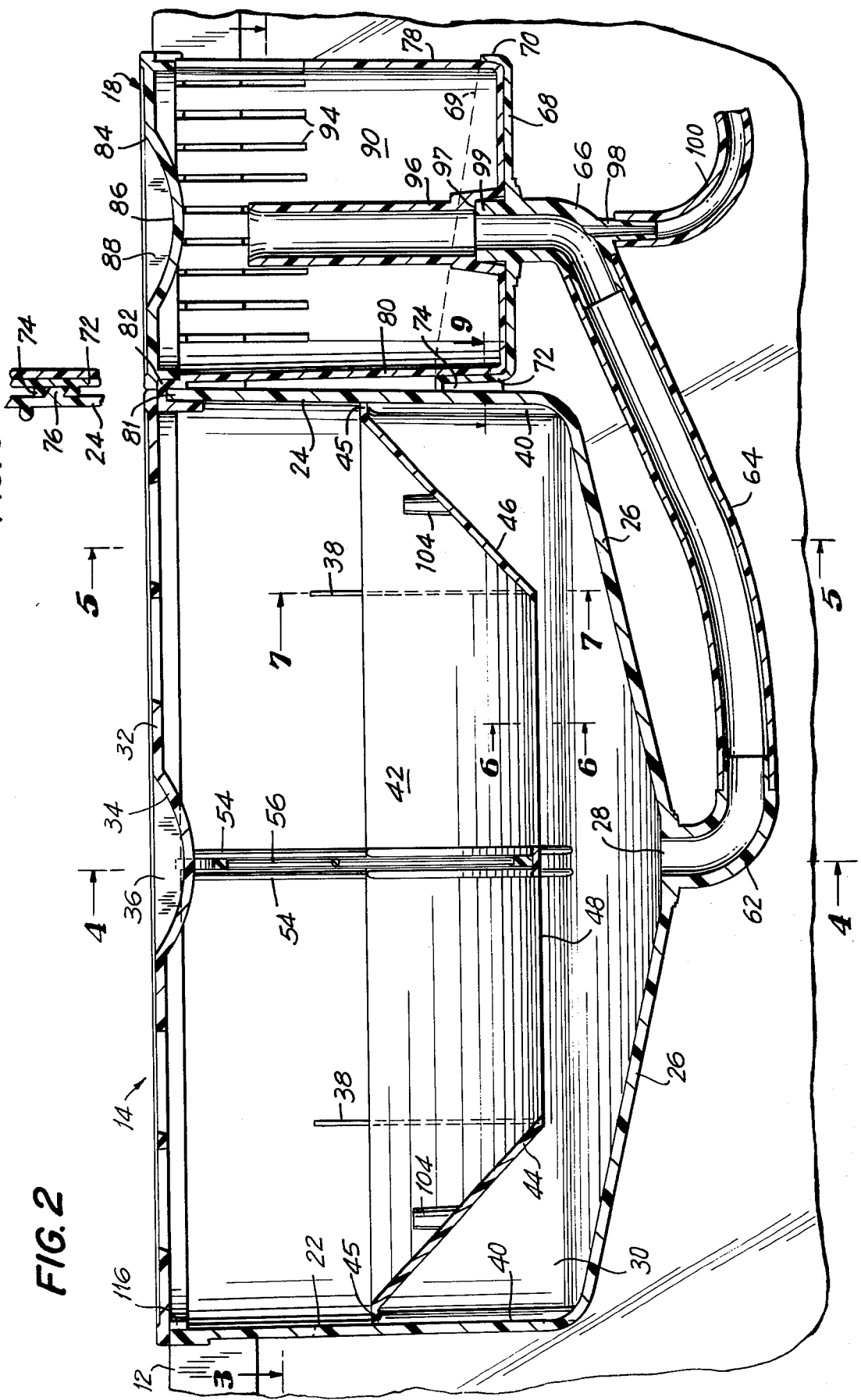

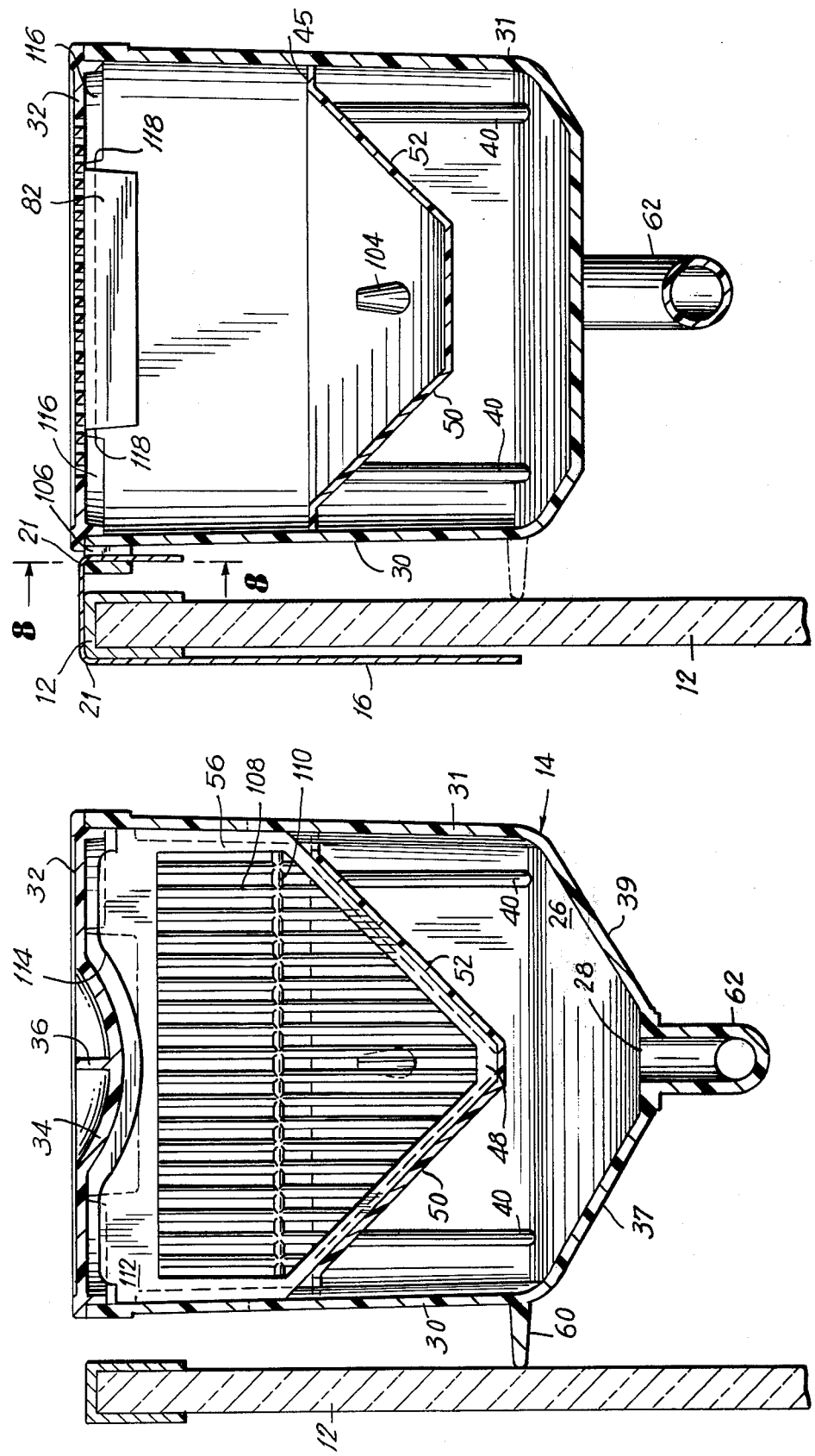

3,900,004

AUTOMATIC CIRCULATING HATCHERY

SUMMARY OF THE INVENTION

This invention relates to a hatchery for detachable assembly in small home and/or hobby aquariums. The hatchery has a totally segregated nursery section for receiving baby fish as they are hatched and for totally segregating them not only from the hatching parent, but also from the general aquarium environment. That is, the nursery section is a completely separable unit, which may be attached to the hatchery. The baby fish are flowingly drawn automatically from the hatchery section proper and received into the nursery, at which time the nursery may be separated from the entire assembly and carried to a different aquarium for further handling. Thus, from the time they are hatched, the baby fish are not exposed to the usual cannibalism inherent in adult fish, either by the hatching parent itself or other adult fish. Moreover, the arrangement herein includes provisions for continuous circulation of the treated aquarium water through both the hatchery and the nursery. This eliminates the problem of stagnant water during the time from the separation of the adult pregnant fish until such time as the baby fish are hatched and removed to a separate aquarium.

BACKGROUND OF THE INVENTION

In raising fish in home and/or hobby aquariums, when adult fish become pregnant, they should be segregated from the rest of the fish in the aquarium, because the actual time of hatching cannot generally be ascertained with any precise determination, and adult fish will eat the baby fish after they are hatched. Thus, it is important, when it is learned that an adult fish is pregnant, to separate that pregnant fish from the rest of the fish in the aquarium. Provisions have been made in the past for a separate container disposed in the aquarium proper with openings therein to afford a separate compartment for the adult pregnant fish, until such time as the baby fish are hatched. However, if the baby fish are hatched at a time when the aquarium is not being observed, the parent fish may eat the baby fish before they can be separated from the parent. To overcome this problem, arrangements have been made previously for continuous circulation of aquarium water through the hatchery section, where the segregated adult fish is located, with small openings therein so that the baby fish will pass through the small openings in a filtered manner, while the adult fish is forced to remain in the segregated area. It is too large to pass through the small openings through which the circulated water passes together with the hatched baby fish.

One of the problems with this arrangement is, however, that the baby fish are removed to the aquarium proper where they are exposed to other adult fish and may be subject to cannibalism by those fish. In certain cases, because of the variety of different fish included in certain aquariums, the baby fish do not readily survive without total separation from these other fish. Moreover, after they are flowingly removed from the hatchery environment and the segregated hatching adult fish, the baby fish are extremely difficult to catch and remove from the general aquarium environment because of their size.

DESCRIPTION OF THE INVENTION

With the arrangement of this invention, by contrast, the baby fish, from the time they are hatched, are totally segregated in a completely separate compartment or nursery section where they are flowingly received after removal from the general hatchery and the adult fish hatching them. Because the baby fish are completely separated from the general aquarium environment, they may be readily removed because of the detachable nature of the separate nursery to a completely different aquarium for their further handling.

Thus, once it is set in place, a completely automatic system is provided with the arrangement herein, eliminating the need for doing anything further until the baby fish are born and deposited into their separate nursery section. Because of the constant circulation provided in both the hatchery section and the nursery section of the device herein, the problems of stagnant water existing in either section are eliminated and the adult hatching fish and the baby fish are kept alive.

Other objects and advantages of this invention will be apparent from the following description, the accompanying drawings and the appended claims.

DESCRIPTION OF THE DRAWINGS

FIG. 1 is a partial top plan view of an aquarium tank showing the disposition of the apparatus, in accordance herewith, in relation to an aquarium tank wall;

FIG. 2 is a sectional view taken along lines 2—2 of FIG. 1;

FIG. 3 is a sectional view taken along lines 3—3 of FIG. 2;

FIG. 4 is a sectional view taken along lines 4—4 of FIG. 2;

FIG. 5 is a sectional view taken along lines 5—5 of FIG. 2;

FIG. 6 is a sectional view taken along lines 6—6 of FIG. 2;

FIG. 7 is a sectional view taken along lines 7—7 of FIG. 2;

FIG. 8 is a sectional view taken along lines 8—8 of FIG. 5; and

FIG. 9 is a sectional view taken along lines 9—9 of FIG. 2.

DESCRIPTION OF THE PREFERRED EMBODIMENT

Referring to the drawings in which like reference characters refer to like parts throughout the several views thereof, a partial top plan view of an aquarium tank 10 is shown in FIG. 1 with walls 12. Suspended from one wall 12 of aquarium 10 is a hatchery section 14, in accordance herewith, suspended from wall 12 by brackets 16. Detachably secured to hatchery section 14 is nursery section 18, which, in turn, is connected through a flexible line 100 to conventional air pump 20, which is also suspended from wall 12.

Referring now to FIGS. 2, 3, 4 and 5, the hatchery tank 14 has end walls 22 and 24, side walls 30 and 31, converging bottom walls 37 and 39, as well as converging longitudinally extending bottom walls 26, all which bottom walls converge toward an exit orifice 28 in the bottom of tank 14. Tank 14 is provided with a cover 32, having a downwardly extending, circumferential flange 116, which fits inside the side walls of tank 14 for a firm frictional grip. Top 32 has a concave central area 34 with an upstanding flange 36 disposed centrally thereof for removing top 32 from tank 14.

End walls 22, 24 each has a pair of integral spaced abutments 40 for receiving the circumferential flange 45 of a V-shaped trap 42 thereon. Because of abutments 40, trap 42 is suspended in tank 14 approximately midway between the top and the bottom thereof. Trap 42, as is the case with tank 14, has converging bottom walls 44, 46, 50 and 52 arranged in opposed fashion, as shown, to converge toward a restricted longitudinal opening 48 in the bottom thereof. Trap 42 has opposed integral knobs 104 in each of the opposed end walls 44, 46 for removal of trap 42 from tank 14.

As can best be seen in FIG. 3, side walls 30, 31 of tank 14 have opposed pairs of integral abutments 54 forming opposed grooves for receiving in sliding engagement, a gate 56 for segregating tank 14 into two separate hatchery sections, for accommodating two pregnant adult fish at the same time. Trap 42 has parallel integral abutments 58 in side walls 50, 52 for receiving gate 56, as well, and for securing gate 56 in place. As can best be seen in FIG. 4, gate 56 is comprised of a lower portion, which is relatively open for providing passage of water between the two sections divided by gate 56, with that section comprised of vertical bars 108 and a horizontal bar 110. The upper solid portion 112 of gate 56 is indented at 114 for accommodating concave portion 34 of cover 32.

A flange 60 is shown in FIGS. 3 and 4, integral with wall 30 for holding tank 14 away from aquarium wall 12. Flange 60 cooperates with adjustable hangers 16 extending over the top of the aquarium wall 12 to hold the entire assembly level. That is, aquarium hangers 16 may be comprised of a distortable metallic material such as aluminum, for example, with an enlarged end portion 17. Side wall 30 may have integral therewith, one or more U-shaped brackets 106 for receiving flexible hangers 16. One of the flexible metallic supporting strips 16 is inserted upwardly through each of brackets 106 until the enlarged portion 17 engages the bottom of brackets 106. Then the supporting strips are bent, as shown at 21 in FIG. 5, to extend outwardly over the top of wall 12 of the aquarium and then downwardly along the side. The flexible supports 16 and the abutment 60 cooperate to hold hatchery tank 14 and its adjacent nursery tank 18 in upright fashion suspended from wall 12.

As can be seen in FIG. 2, exit orifice 28 of tank 14 is defined by a nipple 62, integral with the converging bottom walls of tank 14. Nipple 62 is configured to receive a flexible tube 64, the other end of which is connected to nipple 66, which, in turn, is integral with a supporting tray or platform 68 for nursery tank 18. Supporting tray 68 has an outer short upstanding wall 70 and an inner higher wall 72, with side walls having an inclined top, as shown at 69 in FIG. 2. The inner wall 72 of supporting tray 68 has a plurality of grooves 74 (FIG. 9) integral therewith, for receiving a plurality of tongues 76, integral with end wall 24 of hatchery tank 14.

Tray 68 supports nursery tank 18, which in turn has an inner end wall 80, an outer end wall 78 and side walls 90, 92. As can be seen in Figs. 2 and 3, walls 90, 92 and 78 have a plurality of openings or slots 94, the purpose of which will be discussed below. Inner wall 80 has disposed at the top thereof, an overhanging lip 82 for supporting nursery tank 18 from the top 81 of end wall 24 of tank 14. Nursery tank 18 has a top 84 with a concave portion 86, similar to top 32 of hatchery tank 14, with a flange 88 for removing top 84 from nursery tank 18.

As can be seen in FIG. 2, nursery tank 18 has an annular integral stack 96 disposed centrally thereof, with stack 96 being indented internally at 97 for receiving an upstanding annular nipple 99. This arrangement provides a secure and sealed fit for accommodating communication between tanks 14 and 18 through flexible line 64. Nipple 66 on supporting platform 68, for nursery tank 18, has a second integral nipple 98 for connection to flexible line 100, which, in turn, is connected to air pump 20.

In operation, tanks 14 and 18 are secured to aquarium wall 12 by suspending them in the water contained in tank 10 to a depth just below slots 94 in tank 18. Then supporting straps 16 are bent as at 21 in FIG. 5 to maintain the tanks suspended from the top of wall 12. Then line 100 from pump 20 is connected to nipple 98 and the pump is turned on. Air passing through line 100 and nipple 98 passes upwardly through annular stack 96 in nursery tank 18 and out through slots 94 in the walls of tank 18. This aspirating action causes water from tank 14 to be drawn through bottom opening or orifice 28, through line 64 and up through stack 96 in tank 18, at which point the water will fall into tank 18. When the water level in nursery tank 18 reaches slots 94, it will flow back into the aquarium tank.

Water will pass from aquarium tank 10 through vertical slots 38 disposed in side walls 30 and 31 into tank 14 as it is drawn out through orifices 28, thus creating continuous circulation through both tanks 14 and 18. Further air will be drawn into the upper portion of hatchery tank 14 through air slots 35 provided in cover 32 of tank 14. Then, the cover 32 may be removed and an adult pregnant fish placed in tank 14. Because of the V-shaped trap 42 disposed in tank 14 with its restricted longitudinal opening 48, the adult fish cannot pass downwardly out through the opening 48 in trap 42. If desired, the gate 56 may be placed centrally in tank 14 and two adult pregnant fish may be accommodated.

When the baby fish are hatched, because of their size, they will be drawn, because of the continuous circulation, downwardly through opening 48 into the lower portion of tank 14 and be carried by the water flow through opening 28, tube 64 and upwardly through stack 96 to fall downwardly into tank 18. Because of the restricted size of openings 94, baby fish will be held in a separated environment inside nursery tank 18. Moreover, this entire action will take place automatically without continuous monitoring of the pregnant adult fish.

When all of the baby fish have hatched and passed into nursery tank 18, it may be lifted carefully off its supporting tray 68 and carried to a separate location for accommodating the baby fish. Because of the orientation of the slots 94, and the upwardly extending stack 96, tank 18 will hold a quantity of water and the baby fish for this transfer.

Because of this accommodation, the baby fish are immediately separated from the adult hatching fish, so that they will not be eaten by those fish, and they are separated and totally segregated from the entire environment of aquarium 10. Nevertheless, they are continuously maintained in treated circulated water. The baby fish are not exposed to other adult fish in the aquarium, and there is no need to attempt to catch them in order to place them in a separate aquarium for further handling or growth.

It should be noted that all of the parts of the hatchery tank and its associated detachable nursery tank may be comprised of a variety of different resins. For example, the various parts may be comprised of injection molded high impact polystyrene. The flexible metallic supports 16 may be comprised of aluminum, for example, and the flexible tubing 64 and 100 may be comprised of any well known flexible resin material such as polyvinyl chloride, for example. Preferably, all the parts will be made of a transparent material so that the activities of the hatching adult fish may be easily monitored and the complete passage of all of the hatched baby fish may be easily determined. Because all the parts are comprised of a resin material which may be easily manufactured, the parts may be produced readily on a mass production basis, thus making the arrangements of the apparatus herein readily available to a large number of people interested in maintaining an aquarium as a hobby.

While the form of apparatus herein described constitutes a preferred embodiment of the invention, it is to be understood that the invention is not limited to this precise form of apparatus, and that changes may be made therein without departing from the scope of the invention which is defined in the appended claims.

We claim:

1. In a hatchery assembly for an aquarium and having a hatchery tank for separating and accommodating adult pregnant fish, and a source of compressed air, the combination which comprises
   a. a separable nursery tank for disposal on said hatchery tank;
   b. means dividing said hatchery tank into a separate adult pregnant fish retention area, said dividing means allowing passage of hatched baby fish therethrough;
   c. flow communication means between said source and said hatchery and nursery tanks;
   d. openings in said hatchery tank allowing water flow from an aquarium into said tank;
   e. means in said flow communication means causing continuous flow of water through said hatchery tank to said nursery tank;
   f. openings in said nursery tank spaced from the bottom thereof, allowing continuous circulation and water overflow therethrough, said openings being dimensioned to prevent the passage of baby fish therethrough;
   g. an opening in the bottom of said hatchery tank below said dividing means;
   h. a first nipple integral with said hatchery tank defining said opening;
   i. a second nipple disposed adjacent said nursery tank defining an opening thereto;
   j. said second nipple having an opening connected to said source;
   k. an annular stack centrally of said nursery tank and integral therewith;
   l. said stack being in flow communication with said second nipple; and
   m. a flexible line joining said first and second nipple.

2. A hatchery assembly as described in claim 1, which also includes
   a. a foraminous divider gate for dividing said retention area into two retention areas for pregnant fish.

3. A hatchery assembly as described in claim 1, which also includes
   a. a nursery tank support tray removably supported on said hatchery tank, said second nipple being integral therewith; and
   b. an upstanding annular nipple integral with said support tray for receiving said nursery tank stack when said nursery tank is disposed on said tray.

4. A hatchery assembly as described in claim 3, in which
   a. the adjacent walls of said hatchery tank and said nursery tank support tray have integral cooperating tongue-in-groove abutments for supporting said tray on said hatchery tank.

5. A hatchery assembly as described in claim 4, in which
   a. one of the walls of said detachable nursery tank has an overhanging lip for supporting cooperation with the top of the adjacent hatchery tank wall.

6. In a hatchery assembly for an aquarium, and having a hatchery tank for separating and accommodating adult pregnant fish, and a source of compressed air, the combination which comprises
   a. a separable nursery tank for disposal on said hatchery tank;
   b. means dividing said hatchery tank into a separate adult pregnant fish retention area, said dividing means allowing passage of hatched baby fish therethrough;
   c. flow communication means between said source and said hatchery and nursery tanks;
   d. openings in said hatchery tank allowing water flow from an aquarium into said tank;
   e. means in said flow communication means causing continuous flow of water through said hatchery tank to said nursery tank;
   f. openings in said nursery tank spaced from the bottom thereof, allowing continuous circulation and water overflow therethrough, said openings being dimensioned to prevent the passage of baby fish therethrough;
   g. a platform integral with said hatchery tank and disposed in said flow communication means for removably receiving said nursery tank; and
   h. cooperating means on said platform and said nursery tank for connecting said nursery tank to said flow communication means.

* * * * *